Jan. 29, 1952  A. H. HAWES  2,584,015
ADJUSTABLE FITTING
Filed Nov. 6, 1945  6 Sheets-Sheet 1
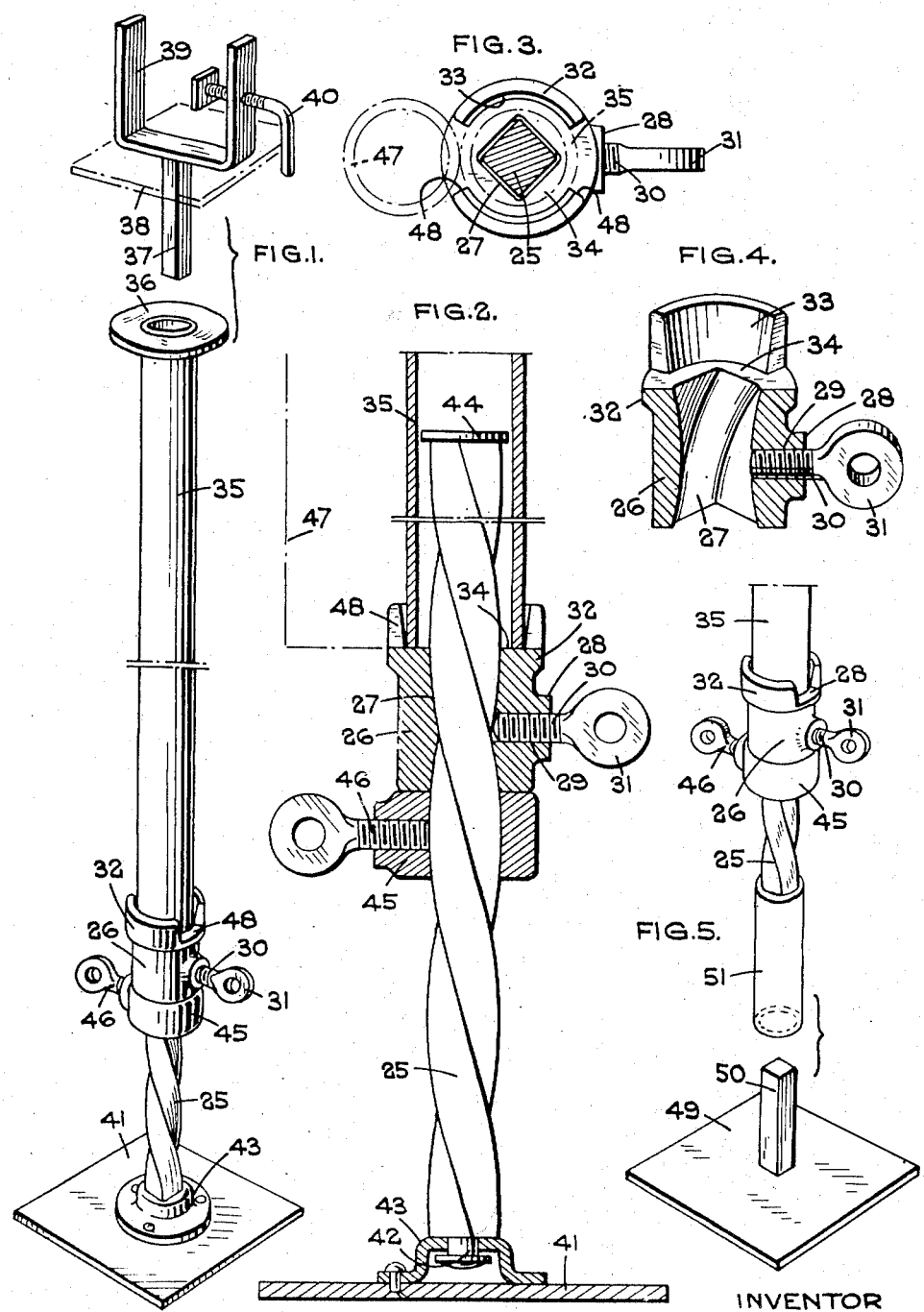
INVENTOR
Albert Henry Hawes.
By
his ATTORNEY

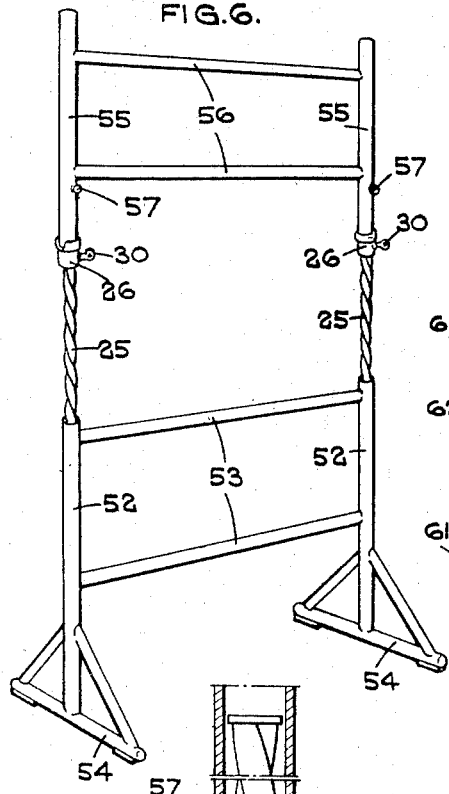
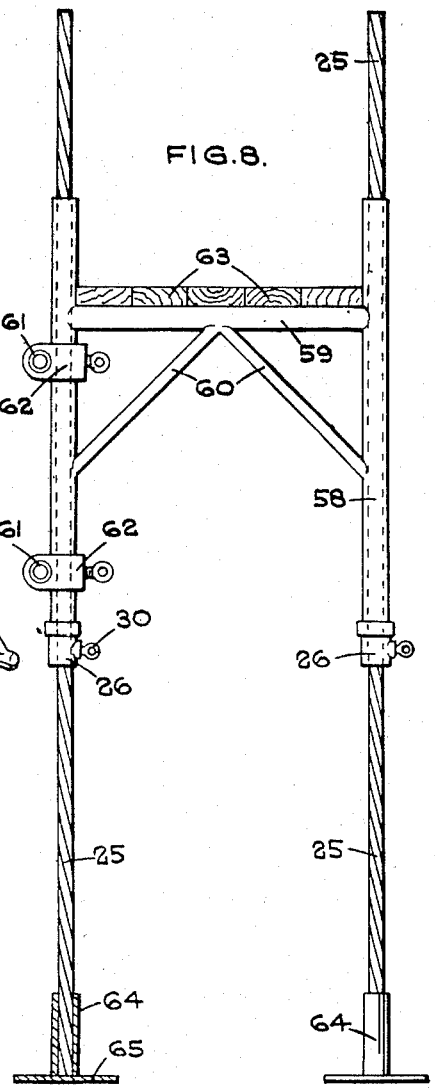
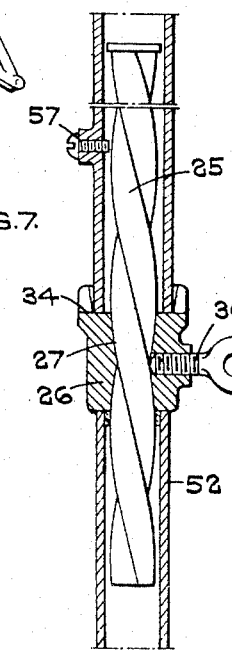

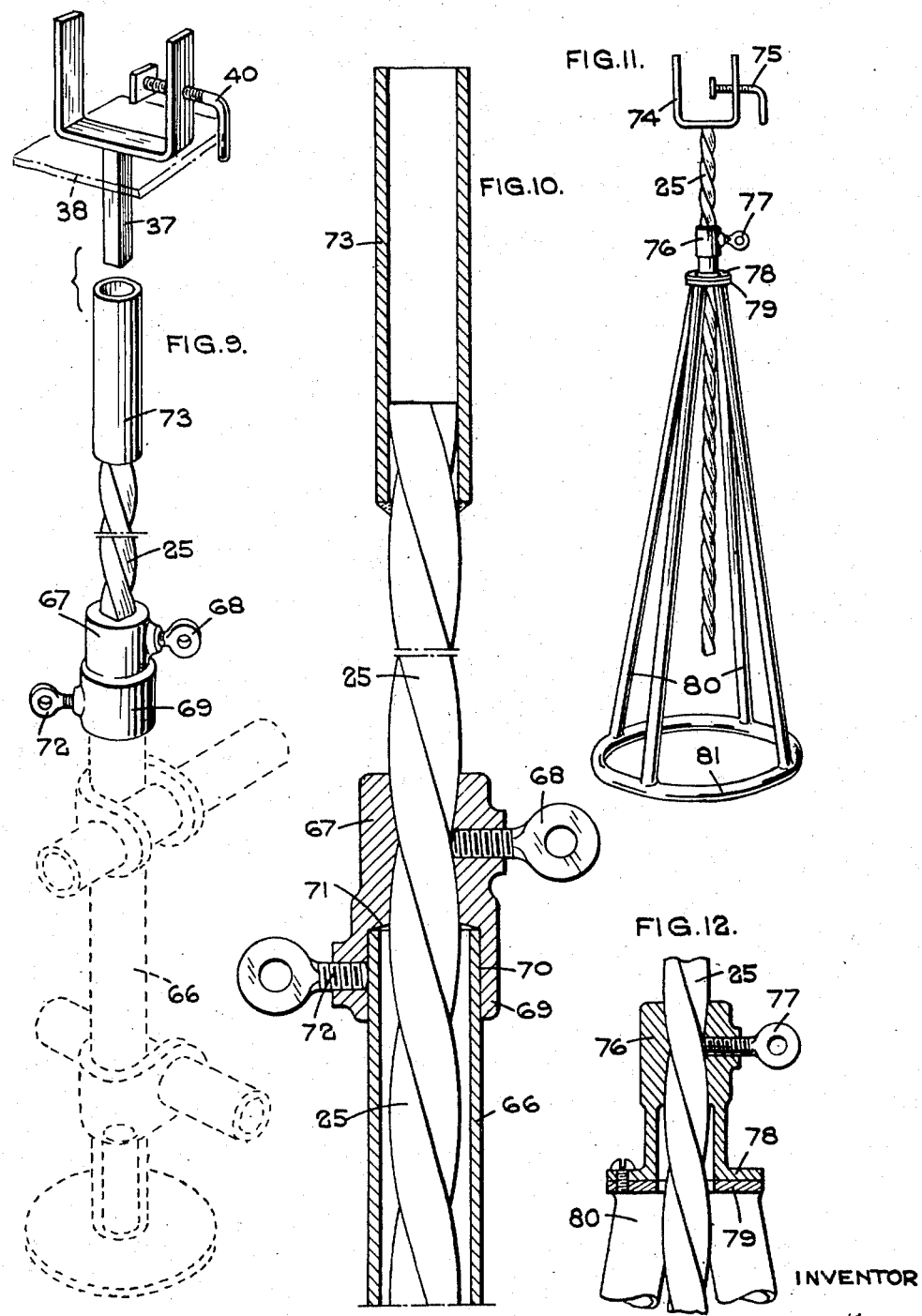

Jan. 29, 1952 A. H. HAWES 2,584,015
ADJUSTABLE FITTING
Filed Nov. 6, 1945 6 Sheets-Sheet 4
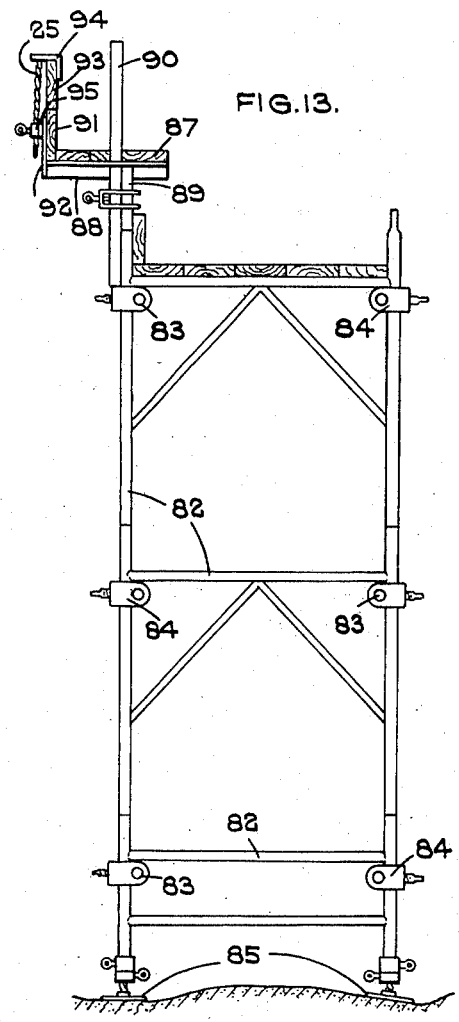
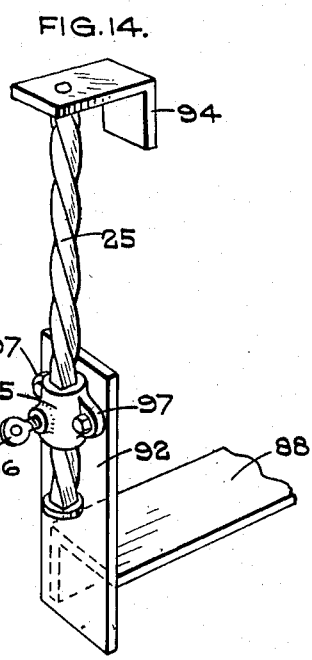
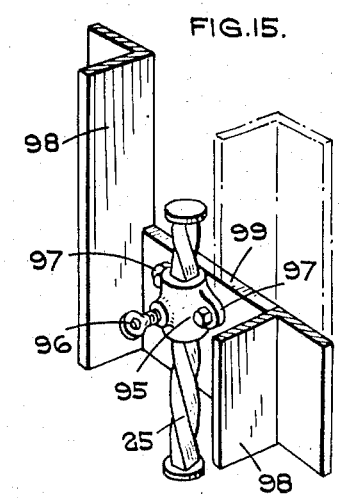
INVENTOR
Albert Henry Hawes.
BY
ATTORNEY.

Jan. 29, 1952     A. H. HAWES     2,584,015
ADJUSTABLE FITTING
Filed Nov. 6, 1945     6 Sheets-Sheet 5
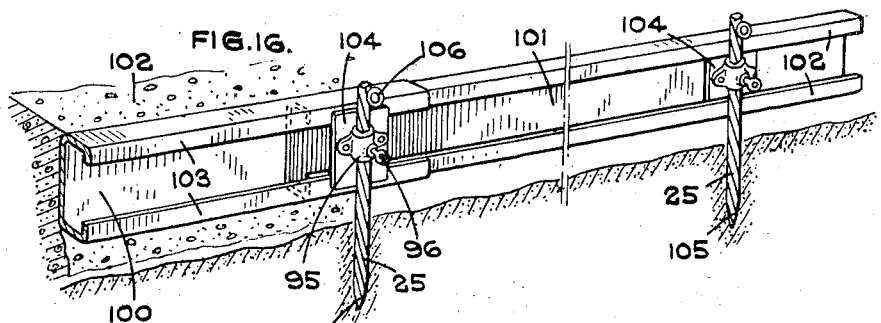
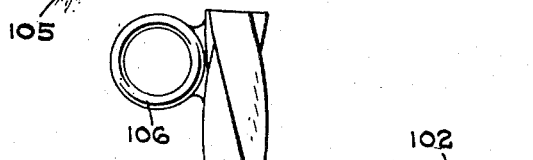
INVENTOR
Albert Henry Hawes
BY
ATTORNEY.

Jan. 29, 1952 A. H. HAWES 2,584,015
ADJUSTABLE FITTING
Filed Nov. 6, 1945 6 Sheets-Sheet 6
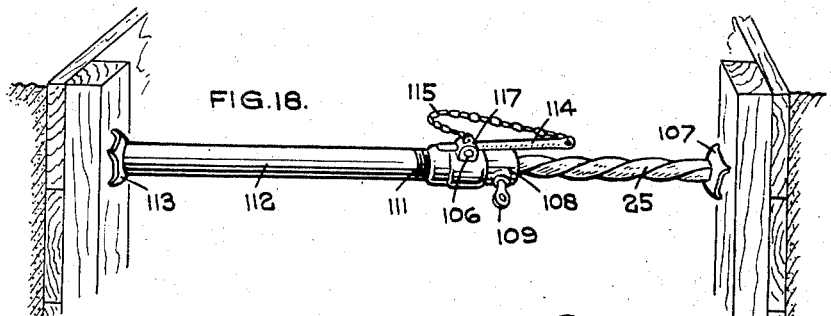
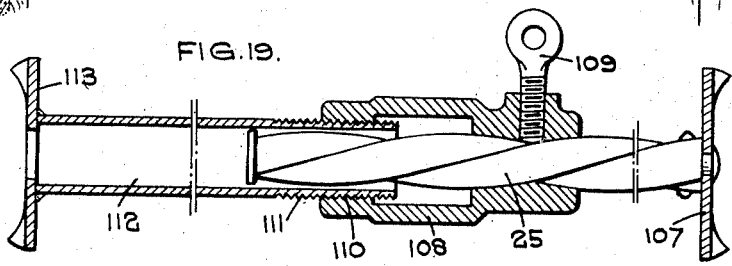
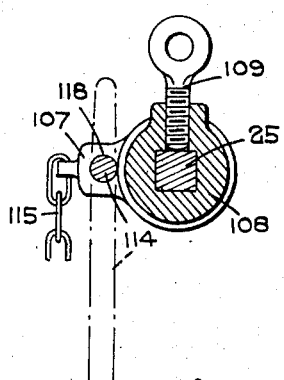
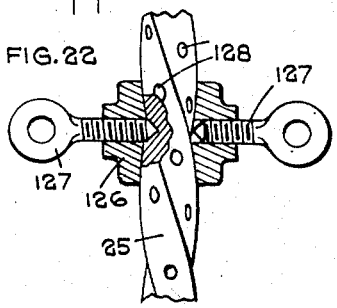
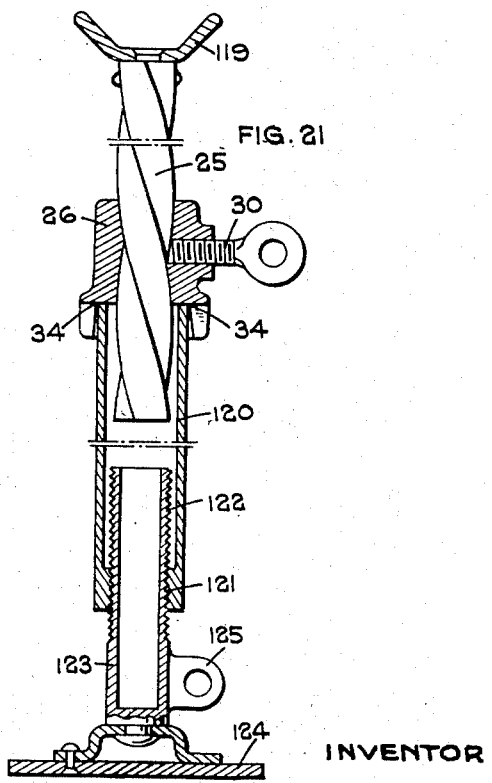
INVENTOR
Albert Henry Hawes
BY
his ATTORNEY.

Patented Jan. 29, 1952

2,584,015

UNITED STATES PATENT OFFICE 2,584,015

ADJUSTABLE FITTING

Albert Henry Hawes, Erdington, Birmingham, England, assignor, by mesne assignments, to Kwikform Limited, Small Heath, Birmingham, England, a British company Application November 6, 1945, Serial No. 627,002
In Great Britain November 6, 1944

4 Claims. (Cl. 248—354)

This invention relates to adjustable fittings for use with builders' equipment, such as scaffolding, shores, trestles, shuttering and the like, as well as for other purposes, and it has for its object to provide a simple and effective device capable of rapid operation. As applied to builders' equipment, the improved device has the additional advantage over those at present in use that its action is not appreciably affected by accumulations of concrete, mud or other material thereon.

A quick-adjustment device according to the present invention consists essentially of a steel or other metal bar of polygonal section twisted about its axis to provide in effect a multi-start screw thread having a very large pitch in relation to its diameter, in combination with a socket member having an internal formation of corresponding shape and provided with a screw or equivalent locking means.

Referring to the drawings:

Figure 1 is a perspective view of a tubular pole or column provided with an adjustable base embodying the present invention.

Figure 2 is a sectional side elevation of the adjustable base and

Figure 3 is a plan view of the same.

Figure 4 is a sectional perspective view of the socket member illustrated in Figures 1 to 3, whilst Figure 5 is a perspective view illustrating an alternative arrangement of the adjustable base.

Figure 6 is a perspective view showing the invention applied to an adjustable trestle, and Figure 7 is a sectional side elevation of a detail thereof.

Figure 8 illustrates, in end elevation, the application of the invention to an adjustable scaffold.

Figure 9 is a perspective view showing the quick-adjustment device employed as an extension of a tubular pole, column or the like.

Figure 10 being a sectional side elevation of the adjustable extension.

Figures 11 and 12 correspond to Figures 6 and 7, but show a different form of trestle.

Figure 13 is an end elevation of a scaffolding provided with platforms for workmen and building material, the material stage having a guard which incorporates the improved quick-adjustment device.

Figure 14 is a perspective view showing the arrangement of the latter.

Figure 15 is a fragmentary perspective view showing the application of the invention to the base of a standard used in connection with shuttering.

Figures 16 and 17 are a perspective view and end elevation, respectively, of road-building forms provided with adjustable locating spikes which embody the present invention.

Figure 18 is a perspective view of a trench shore provided with the improved adjustment device.

Figures 19 and 20 are a sectional side elevation and plan view, respectively, of the arrangement shown in Figure 18.

Figure 21 illustrates in side elevation another form of jack or adjustable shore, and Figure 22 is a fragmentary sectional view showing a modified adjustment device for use with exceptionally heavy loads.

The two principal members of the improved quick-adjustment device are clearly shown in Figures 1 to 4, which illustrate the application of the invention to an adjustable base for a tubular pole, column or the like.

One member of the device comprises a length of square-section steel bar 25 which has been twisted about its axis so as to produce in effect a four-start screw thread having a relatively large pitch (for example, a pitch equal to, say, ten times the minimum diameter of the bar).

Cooperating with the bar 25 is a nut 26 having a hole 27 therethrough and an internal formation corresponding to the exterior of the twisted bar 25. As illustrated, the axial length of this nut 26 is approximately one-fifth of the pitch of the helical formation of the bar 25.

The nut 26 is conveniently formed by casting metal about a core of suitable shape, which may be constituted by a short length of the actual twisted bar.

At one side the nut 26 is formed externally with a boss 28 through which extends a radially-disposed hole 29 tapped to receive a set-screw 30, the arrangement being such that the inner end of the screw 30, when advanced into the hole 27, engages one face of the twisted bar 25 which passes through the latter.

Although after twisting, the faces of the square bar appear somewhat concave, the cross-sectional shape of the bar is actually straight-sided in any plane perpendicular to the bar axis, the set-screw 30 lying in one such plane and engaging one face of the bar 25 approximately on a medial line when the nut 26 is in position, (see Figure 4).

The screw 30 is preferably formed with a head 31 of eye form for engagement by a tommy-bar (although, if desired, a hexagon or other head may be provided), and it will be appreciated that when the screw 30 is tightened the opposite face of the socket hole 27 is drawn into frictional engagement with the adjacent face of the bar and, owing to the helical formation of the contacting faces, a very secure locking action is thus obtained.

At its upper end, the nut 26 is formed with an enlargement 32 having a plain substantially cylindrical, or slightly conical, interior surface 33 and an internal diameter somewhat greater than the overall diameter of the helically-formed hole 27 so that an annular seating 34 is provided for supporting a tubular element 35.

Such tubular elements are, of course, well known in connection with builders' equipment and the element 35 may be a scaffold standard, or a column or prop used to support, for example, a working platform, ceiling shuttering members, or temporary beams which carry the latter. The upper end of the member 35 may have a thrust plate 36 fixed thereto, or it may receive a square or other spigot 37 dependant from a separate thrust plate 38 or a crutch 39 which latter may be provided with a screw 40 for clamping horizontal members therein.

The lower end of the twisted bar 25 may be rotatably connected in any suitable manner to a foot member 41; for example, it may be formed with a reduced spigot 42 which is engaged with, and headed over internally of, an annular domed plate 43 carried by the member 41.

In using the apparatus thus far described, the tubular element 35 is slipped over the upper end of the twisted bar 25 and lifted manually or otherwise to the desired height, after which the nut 26 is simply spun up the bar 25 to engage the lower end of the element 35 and locked in position by the screw 30. As a substantial length of the twisted bar 25 will normally be housed within the tubular element 35, the latter is supported in alignment with the bar 25, and the latter may be enlarged at its upper end, as at 44, to assist in maintaining its coaxial relationship with the element 35 as well as to prevent loss of the nut 26 from the bar 25.

If desired, an increased locking action may be obtained by adding a second nut 45, below the nut 26, this second nut being similarly formed internally and also provided with a set-screw 46 which corresponds to the screw 30.

When lowering the tubular element 35 in relation to its base, the auxiliary nut 45 may be run down the twisted bar 25 to the extent desired and will then serve to carry the weight whilst the main nut 26 is being secured in its new position.

In some cases, it may be desired to secure a second tubular element alongside the element 35, as indicated at 47, and to permit of this the annular wall surrounding the seating shoulder 35 may be formed with gaps 48 at oppositely disposed positions, the lower end of the element 47 being seated in one of such gaps.

Figure 5 illustrates the use of an alternative form of base for the quick-adjustment device. In this case, the foot member 49 carries an upstanding stem 50 of square or other section which enters a tubular socket 51 fixed to the lower end of the twisted bar 25.

Figures 6 and 7 illustrate the application of the invention to what is known in the trade as a "rising trestle." This comprises a base portion consisting of two vertical tubes 52 connected in spaced relationship by horizontal ties 53 and provided with braced foot members 54. In this case, a twisted bar 25 is fixed in and projects upwardly from each of the tubes 52, and the seating shoulders 34 of the nuts 26 support tubular uprights 55, which correspond to the elements 35 of the preceding construction and are connected by horizontal ties 56.

In use, the horizontal members 53, 56 of the trestle may support battens or platforms, the upper portion of the scaffold being adjusted and secured in position in exactly the same manner as the element 35 in the preceding construction. If desired, grub screws 57 passed through the walls of the upper tubes 55 may cooperate with the enlargements 44 at the upper ends of the bars 25 to prevent complete separation of the two portions of the trestle.

Figure 8 shows a "rising scaffold" in which use is made of prefabricated frames each comprising two vertical tubes 58 connected by one or more horizontal members such as 59 and braced, if necessary, with diagonal members 60 to provide a rigid frame. Two or more such scaffold frames are rigidly connected in spaced relationship by means of ledgers 61 secured to the uprights 58 by means of clamps 62. A platform of battens 63 may be rested upon the horizontal members 59, and the whole assembly is slidably mounted on upright columns, which pass through the tubes 58.

The twisted bars 25 which form these columns are considerably longer than those shown in previous figures but carry the same nuts 26 on which the scaffold frames are adjustably supported. Each bar is provided with a base of simple construction (for example, it may be engaged in a tubular socket 64 fixed to a foot plate 65), but the self-supporting character of the scaffold is dependent upon the rigidity of the structure comprising the scaffold frames and their connecting ledgers. Obviously a similar arrangement may be used in the construction of rising towers.

In Figures 9 and 10, the invention is applied to an adjustable upward extension for a tubular scaffold element indicated at 66. It will be noted that the construction shown is substantially an inversion of that already described with reference to Figure 5. In this case however, the twisted bar 25 cooperates with a modified form of socket member 67 which has a main portion of internally helical form provided with a locking screw 68 and an enlarged lower portion 69 having a plain cylindrical bore 70 of larger diameter than the helical formation. The annular shoulder 71 below the latter seats upon the scaffold element 66 which is gripped by a binding screw 72 in the wall of the enlargement 69.

A short length of tube 73 fixed to the upper end of the twisted bar 25 may cooperate with one of the forms of thrust member shown in Figure 1.

In the "jumper trestle" of Figures 11 and 12, a crutch 74 with clamping screw 75 is fixed to the upper end of the twisted bar 25, the socket member 76 having an internal helical formation, a locking screw 77, and a peripheral flange 78 at its lower end which is secured to an annular plate 79 forming the top of the trestle base. This latter, which is rotated bodily when adjusting the trestles, comprises a plurality of downwardly divergent legs 80 fixed at their upper ends to the plate 79 and at their lower ends to a ring 81 on which the trestle stands. Such trestles may be constructed with bases of various heights.

In Figure 13 I have illustrated a scaffold assembly including superposed tubular frames 82 forming panels which are connected by ledgers 83 clamped to the upright members thereof at 84. Adjustable bases corresponding to those illustrated in detail in Figures 1 to 4 may be applied to the legs of the lowermost frames as at 85.

The uppermost frames 82 support a working platform 86, associated with which is a stage 87 for workmen's materials. This stage may be supported on angle bearers 88 having dependent stems 89 which are clamped to upward extensions 90 of the scaffolding.

At the outer edge of the stage 87, there is provided a guard, conveniently formed by laying battens 91 on edge against upstanding brackets 92 carried by the angle bearers 88.

To enable the height of the guard to be adjusted by the addition of a further batten or battens 93, use may be made of the present invention in the form shown in detail in Figure 14. The twisted bar 25 which in this case has its upper end rotatably connected to an angle bracket 94 for engaging over the uppermost batten, extends through a modified nut 95 having the same internal formation as those previously described, a locking screw 96, and lateral lugs 97 for attachment to the adjacent bracket 92.

Figure 15 shows another application of the same form of socket member, the twisted bar 25 in this case providing an adjustable base for vertical standards 98 used in connection with wall shuttering, the attachment lugs 97 of the nut 95 being secured to a plate 99 joining the lower ends of the standards 98.

In Figures 16 and 17 I have shown telescopic forms for use in the construction of concrete roads or road-beds, the telescopic members 100, 101 being of channel section and arranged so that the moulding of the poured material 102 is effected by the bases of the various channels. Each form element has inturned edges 103, connected by a plate or plates 104 to which is attached a nut 95 corresponding to that just described and associated with a twisted bar 25 whose lower end is pointed at 105.

The twisted bars 25 act as locating spikes for the forms 100, 101 and permit adjustment of the depth of the concrete 102, inasmuch as they may be raised or lowered relatively to the nuts 95 by twisting them in the latter with a tommy bar passed through an eye 106 at the upper end of each bar.

The forms 100, 101 are supported in any suitable manner with the upper edges at the desired level, and the locking screws 96 having been released, the bars 25 are twisted downwardly until they penetrate the ground to a suitable depth, the screws 96 being then operated to lock the nuts 95 to the bars 25.

Figures 18 and 19 illustrate an adjustable shore for use in a substantially horizontal position between the sides of trenches, the quick-adjustment device forming the subject of the present invention being here supplemented by fine-adjustment means capable of delivering an axial thrust.

The trench shore illustrated comprises a twisted bar 25 provided with a rotatable pad 107 at its outer end and cooperating with a modified nut 108. This latter is formed internally at one end with a helical formation engaging the bar 25 which is locked by a screw 109 in the manner already described. The other end of the nut 108 is screw-threaded internally at 110, and cooperates with an external thread 111 on a tubular member 112 coaxial with the twisted bar 25, the internal diameter of the tube 112 being such that the bar 25 can pass within it when the shore is retracted. A second thrust pad 113 is fixed to the outer end of the tube 112, and both thrust pads may be formed with teeth to obviate any risk of their slipping on the trench walls.

In operation, the screw 109 is released and the twisted bar 25 is drawn out until both thrust pads 107, 113 are in contact with the sides of the trench. This primary adjustment is then locked by tightening the screw, and the shore is then expanded axially to exert pressure upon the trench sides by rotating the socket member 108 and twisted bar 25 relatively to the tube 112. To effect this, a tommy bar 114, which may be held captive by a chain 115, is engaged with a hole 116 in a lateral lug 117 provided on the nut 108, as indicated in broken lines in Figure 20. When not in use, the tommy bar 114 may be accommodated in a second hole 118 formed in the lug 117 at right angles to the hole 116, being then disposed substantially parallel to the axis of the shore as shown in Figure 18, instead of tangentially.

Obviously, the shore above described may be used in an upright position if desired, but the modified construction shown in Figure 21 has been found more convenient for general jacking purposes.

This jack or jack shore comprises a twisted bar 25 provided with a fixed or rotatable thrust member 119 and a nut 26 corresponding to that shown in Figures 1 to 8, this nut 26 being used inverted with its internal shoulder 34 engaging the upper end of a coaxial tubular member 120. The lower end of the member 120 is screw-threaded internally at 121 to engage an external thread 122 on a second coaxial tubular member 123, this latter being rotatably mounted upon a foot plate 124 and provided with a tommy bar lug 125 to facilitate its rotation after the initial quick adjustment has been made as previously described. The rotatable mounting of the tube 123 may be arranged in the same manner as the mounting of the bar 25 in Figures 1 and 2. The twisted bar 25 and threaded tube 123 are housed within the central tube 120 when the jack or shore is retracted.

Obviously, if desired, a fine adjustment device involving interengaging screw-threaded members may be applied to the constructions shown in Figures 1 to 4 and in Figure 5 the nut 26 and tubular element 35 illustrated in these figures being replaced by the members 108, 112, respectively, of Figures 18 and 19.

Adjustable shores constructed as above described are obviously suitable for use, either erect or horizontally, in mine galleries and tunnels and the jack shores referred to are readily as applicable as adjustable props for use in dry docks and shipyards, as well as for propping up wheeled gantries and loaded road vehicles.

It will be understood that any of the other constructions previously described may be suitably modified to provide for a fine adjustment by relative rotation of screw-threaded member in addition to the quick-adjustment provided by the twisted bar and socket member.

Obviously, instead of the twisted bar 25 being of square section, it may be triangular, rectangular, hexagonal, octagonal or of any other suitable polygonal shape in cross section, the socket member, of course, having a corresponding internal formation.

If desired, instead of employing a straight-sided section, any or each face of the bar 25 may be formed before twisting, with a longitudinal recess or concavity. That is to say, each face of the bar may be of part-cylindrical configuration or formed with a longitudinal recess of any suitable section. This concave or recessed formation of the bar faces is, of course, retained after twisting.

When extremely heavy loads are to be carried by the quick-adjustment device, it may be desirable to supplement the frictional locking action by providing a positive grip, although under normal conditions this will be quite unnecessary.

One method of providing such a positive locking action is to form a series of spaced indentations, such as countersunk holes, in one or more faces of the bar, such faces before twisting being either flat, concave or recessed as aforesaid. The indentations may be arranged medially of the face or faces on which they are formed and are engaged by the inner end of the locking screw when the latter is tightened.

Whatever construction is employed, the socket member may be provided with two or more locking screws, and in Figure 22 I have illustrated a modified form of nut 126 provided with aligned locking screws 127 whose inner ends are pointed or rounded to engage indentations 128 in opposite faces of a square section bar 25.

Preferably, as shown, the indentations 128 in one face of the bar 25, are staggered relatively to those in the opposite face so that the socket member may be positively locked at any one of a number of closely spaced positions.

The hollowing, recessing or indenting of the faces of the bar may be effected during the initial rolling of the latter, or subsequently.

What I claim then is:

1. A support for scaffolds and the like comprising a base, a bar having a multiple thread of elongated pitch swivelly connected to said base, and a nut loosely mounted and rapidly movable on said bar, a tubular extension slidable over said bar and resting on said nut, said nut having an internal thread corresponding to that of the bar, said nut having means thereon for locking same to the bar at any point along its length, said nut having an open socket at its upper end to support said tubular extension, said extension being loosely and removably supported in said socket.

2. A support according to claim 1, in which a portion of the wall of the socket member is cut away to support the leg of an adjacent extension member.

3. A support according to claim 1, in which the nut has a shouldered ledge to support the leg of an adjacent extension member.

4. A support according to claim 1, in which a second nut is provided on the bar to lock said first nut in any adjusted position.

ALBERT HENRY HAWES.

REFERENCES CITED

The following references are of record in the file of this patent:

UNITED STATES PATENTS

| Number | Name | Date |
| --- | --- | --- |
| 204,359 | Munson | May 28, 1878 |
| 385,569 | Penfield | July 3, 1888 |
| 424,711 | Homan | Apr. 1, 1890 |
| 426,163 | Bergmann | Apr. 22, 1890 |
| 565,442 | Durnell | Aug. 11, 1896 |
| 1,227,105 | Barnes | May 22, 1917 |
| 1,372,990 | Bakovich | Mar. 29, 1921 |
| 1,417,565 | Ralph | May 30, 1922 |
| 1,612,124 | Huelsick | Dec. 28, 1926 |
| 1,681,010 | Raggio | Aug. 14, 1928 |
| 1,719,528 | Beckley et al. | July 2, 1929 |
| 1,916,476 | Harbaugh et al. | July 4, 1933 |
| 2,291,170 | Moths | July 28, 1942 |

FOREIGN PATENTS

| Number | Country | Date |
| --- | --- | --- |
| 543,853 | Great Britain | Mar. 16, 1942 |